United States Patent [19]

Hinlein

[11] Patent Number: 5,153,794
[45] Date of Patent: Oct. 6, 1992

[54] ASSEMBLY AND METHOD FOR SECURING HEAD SUSPENSIONS ON ACTUATOR ARMS

[75] Inventor: Sigmund Hinlein, Sudbury, Mass.

[73] Assignee: Digital Equipment Corporation, Maynard, Mass.

[21] Appl. No.: 626,588

[22] Filed: Dec. 7, 1990

[51] Int. Cl.$^5$ ............................................. G11B 21/16
[52] U.S. Cl. ...................................................... 360/104
[58] Field of Search ................... 360/104, 105; 29/603

[56] References Cited

U.S. PATENT DOCUMENTS

| | | | |
|---|---|---|---|
| 5,012,367 | 4/1991 | Toensing | 360/104 |
| 5,027,241 | 6/1991 | Hatch et al. | 360/105 |
| 5,062,018 | 10/1991 | Yaeger | 360/104 |

FOREIGN PATENT DOCUMENTS

0298012 12/1987 Japan .................. 360/104

Primary Examiner—David J. Severin
Attorney, Agent, or Firm—Ronald E. Myrick; Barry N. Young; Ronald C. Hudgens

[57] ABSTRACT

An assembly and method for securing head suspension members on shelf segments of metallic or ceramic actuator arms in a disk drive. The assembly comprises an actuator arm with a reduced thickness shelf segment, at least one head suspension member, a staking member having particular attributes and a staking plate also having particular attributes. The assembly is designed such that forcible expansion of the staking member takes place exclusively within the material of the staking plate member. The method is formulated such that the constituent elements of the assembly are aligned, placed under compression and staked together wherein an interference fit is formed between the staking member and staking plate member and no forcible pressure from the staking procedure is transmitted to the actuator arm. The assembly and method are ideally utilized in a multi-disk disk drive in which a plurality of head suspensions are secured to multiple arms of a single actuator in a single procedure.

39 Claims, 7 Drawing Sheets

ASSEMBLY AND METHOD FOR SECURING HEAD SUSPENSIONS ON ACTUATOR ARMS

BACKGROUND OF THE INVENTION

1. Field of the Invention

This invention relates to an improved method of securing head suspension members to actuator arms for use in disk drives, and particularly relates to a method of securing the head suspension members to very thin shelf segments of actuator arms for the purposes of decreasing the internal spacing of storage disks in a conventional disk drive envelope and minimizing actuator arm shelf cracking during production.

2. Related Art

In a disk drive assembly the magnetic heads of the drive are secured to the distal ends of head suspension members. The proximal ends of these head suspension members are attached to an actuator having multiple arms with protruding shelf segments. The actuator is in turn connected to a servo or stepping motor. The magnetic heads of the drive are moved to selected tracks on the disks by means of the servo or stepping motor via the actuator, its arms and the connected head suspension members.

There are various methods of attaching head suspension members to an actuator arm. Such methods include glue, screws, clamps, and staking.

In one known staking method two head suspension members are attached to a shelf segment of an actuator arm by means of two staking members having short tubular stems each of which are aligned through holes in the head suspension members and into a through hole on opposing sides of the protruding shelf segment of the actuator arm. The stems of the staking members are thereafter forcibly expanded within the structural material of the shelf segment of the actuator arm by driving a ball bearing through the stem tubes.

This particular method, although effective, has several limitations. One limitation of this method is the requirement of using two separate staking procedures to attach two head suspension members. The individual staking members, being positioned on opposing sides of the arm shelf segment, have to be staked to the actuator arm in separate procedures (i.e. one from each side).

A further limitation of expanding the tubular stem portion of the staking members within the structural material of the shelf segment lies in the configuration of the acutator arm and its shelf segment. To allow expansion of two staking members within the structural material of the shelf segment there must be a significant thickness of the actuator arm and the shelf segment. The thickness of the shelf segment necessary to this method prevents an ideal back to back mounting of the head suspension members and thus prevents a decreased internal spacing of the disks which rotate in between the multiple arms of the actuator. Ideally the space between the disks should only be limited by the height of the magnetic heads and the thickness of the head suspension members.

The most significant limitation in expanding the stem of the staking members within the structural material of the shelf segment is the possibility of cracking the shelf segment during the staking procedure. Cracking of the shelf often occurs despite the given thickness of the actuator arm and shelf segment. The nature of the assembly employed in this method channels the force of the staking procedure directly into the material of the shelf segment. If there is even a slight structural defect in the material of the actuator arm or shelf segment or if the staking procedure is not performed correctly the shelf segment of the actuator arm will crack. Cracking of the shelf segment results in defective assemblies and is a costly problem in mass manufacturing the actuator arm assemblies. The staking procedure is one of the last assembly procedures to take place in the manufacturing process. If the shelf segment cracks during the staking procedure the entire semi-complete multiple arm actuator assembly must be discarded at a significant cost.

In response to these limitations another method of staking was developed in which only one staking member was employed. In this method two head suspension members are first attached to opposing sides of the flange of the staking member and then the staking member is subsequently secured to the actuator arm shelf in a single staking procedure. In using only one staking member the thickness of the actuator arm and shelf segment is decreased because the shelf segment only has to withstand the force of one staking procedure. Using this method simplifies manufacturing procedures and decreases disk spacing to some extent but it still has significant limitations.

The single staking member procedure allows a small decrease in the spacing of disks, but the spacing of the disks is still limited by the thickness of the shelf segment and the resulting space between the mountings of the head suspension members (i.e. the thickness of the flange of the staking member. Also the force exerted by the staking procedure is still channeled directly into the structural material of the shelf segment. Cracking within the structural material of the shelf segment still occurs due to structural limitations. As a result, a significant percentage of the actuator arm assemblies still have to be discarded.

The problem related to the cracking of the actuator arm becomes more severe with an anticipated change in structural materials to ceramics. The metallic materials presently used expand and contract slightly when exposed to changes in temperature due to a metallic material's inherent coefficient of thermal expansion. These expansions and contractions hinder the accurate placement of the magnetic heads on the disks.

Because ceramic materials have no coefficient of thermal expansion there is an anticipated change in actuator arm materials to ceramics. This change will increase the accuracy of head placement by eliminating thermal expansions and contractions. However, this change creates problems in attaching head suspension members to ceramic actuator arms by any type of staking method. Expanding a staking member within an actuator arm formed from a ceramic material is impossible without shattering the arm and shelf segment. The cracking problem described is a major hindrance in the development of technology related to ceramic actuator arms.

Accordingly a purpose of the present invention is to overcome the disadvantages of the prior art by providing an alternative assembly and method for securing head suspensions to very thin shelf segments of metallic and ceramic actuator arms.

SUMMARY OF THE INVENTION

In this invention a single staking member with particular attributes is utilized wherein a lower portion of the stem of the staking member is controllably expanded into a staking plate member during the staking procedure thereby eliminating the problems associated with cracking of the shelf segment. Also the thickness of the actuator arm and shelf segment is significantly reduced, thereby limiting the spacing between the disks only by a marginal thickness of the shelf segment, the height of the magnetic head member and the thickness of the head suspension member.

The assembly portion of invention features an assembly for securing head suspensions to thin shelf segments of actuator arms comprising an actuator arm having a reduced thickness shelf segment with an aperture therethrough, a staking member having a flange element and a stem element with a bore extending through these elements, at least one head suspension member having an aperture on its proximal end, and a staking plate member having an aperture for receiving the lower portion of the stem of the staking member with the stem passed through the aligned apertures of the head suspension member and the shelf segment.

The assembly portion of the invention also features one or more sub-assemblies comprising either, a staking member and a head suspension member attached together, or a staking plate and a head suspension member attached together.

The method portion of the invention features a method of securing one or more head suspension members to thin shelf segments of actuator arms comprising the steps of providing a staking member with particular attributes, providing a staking plate member with particular attributes, aligning the respective apertures of at least one head suspension member and shelf segment with the stem of the staking member, disposing the stem of the staking member through the aligned apertures, positioning the staking plate member with its aperture in alignment with and receiving the stem of the staking member, placing the assembly under compression and controllably expanding the lower portion of the stem of the staking member into the adjacent wall of the staking plate member. Because of the design of the assembly and the method used, the expansion of the stem during the staking process occurs only within the staking plate. The force exerted in the staking procedure is channeled into the staking plate rather than the shelf segment of the actuator arm and thus eliminates the problem of cracking the shelf segment during production.

The assembly and method will ideally be used in multi-disk disk drives. The design of the assembly and the method used allow a plurality of assemblies to be secured to a multiple arm actuator assembly in a single procedure. This single staking procedure is made possible by using multiple die and anvil castings spaced in between each assembly to place each individual assembly under compression.

Other objects, features and advantages of the invention will become apparent from a reading of the specification when taken in conjunction with the drawings, in which reference numbers refer to like elements in the several views.

DESCRIPTION OF THE PREFERRED EMBODIMENTS

Figure 1:
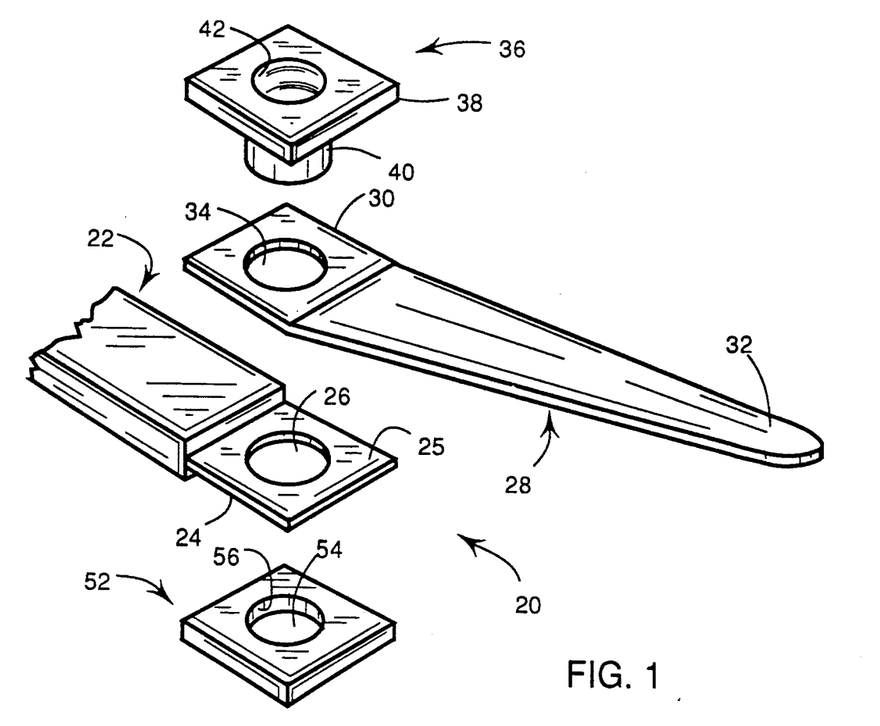
FIG. 1 is an exploded isometric view showing an assembly for securing at least one head suspension member to a surface of a shelf segment of an actuator arm in accordance with the invention.

Referring now to the drawings and particularly to FIG. 1 there is shown a head suspension support assembly for securing one head suspension member to a surface 25 of a shelf segment of an actuator arm, the assembly 20 having an actuator arm 22 with a reduced thickness shelf segment 24 at the distal end thereof, one head suspension member 28, a staking member 36 having a flange element 38 and a stem element 40, and a staking plate member 52.

The actuator arm 22 is generally elongate and generally rectangular in cross-section, being formed of either a metallic or ceramic material, with a reduced thickness shelf segment 24 which extends outwardly from its distal end. The shelf segment 24 is aligned with, and centered relative to, the widthwise longitudinal centerline of the actuator arm 22. For assembly purposes, the shelf segment has an aperture 26 of a given diameter.

The head suspension member 28 is an elongate member formed from a suitable strip of metallic spring material of bronze or brass or the like, and has a proximal end 30 and a distal end 32. The distal end 32 is configured for securing a magnetic head member 33 (See FIG. 10) thereto and the proximal end 30 is provided with an aperture 34 for assembly purposes. The aperture 34 is substantially equal in diameter to the given diameter of the aperture 26 of the shelf segment 24.

The staking member 36 is mushroom shaped with a flange element 38 of generally square head dimensions and a stem element 40 with an outer diameter slightly less than the diameter of the aperture 26 of the shelf segment 24. The combined height of the flange element 38 and the stem element 40 should be no greater than the thickness of the actuator arm 22 adjacent the shelf segment 24. The staking member 36 has a bore 42 extending through the flange and stem elements. The bore 42 has an upper portion 44 and a lower portion 46, these upper and lower portions being separated by a staking line 48 located at a defined dimension from the outer surface of the flange element 38. (See FIG. 8) The upper portion 44 of the bore 42 has a generally uniform interior diameter, and the lower portion 46 of the bore 42 has inwardly protruding sidewalls 50 which create an obstruction in the form of a smaller interior diameter relative to that of the upper portion 44. The defined dimension locating the staking line 48 is of a length generally equal to the combined thicknesses of the flange element 38 of the staking member 36, at least one head suspension member 28 and the shelf segment 24 of the actuator arm 22. The length of the lower portion 46 of the bore 42 is substantially equal to the thickness of the staking plate member 52. The staking member 36 is generally configured for insertion through the aperture 34 of at least one head suspension member and the aperture 26 of the shelf segment 24 of the actuator arm 22.

The staking plate member 52 is of generally square dimensions and is of a given thickness. For purposes of assembly the staking plate member 52 is provided with an aperture 54 for receiving, in alignment with, the lower portion 46 of the bore 42 of the staking member 36. The aperture 54 is substantially equal in diameter to the given diameter of the aperture 26 of the shelf segment 24 of the actuator arm 22. The alignment is such that impact of an expansion tool with the inwardly protruding sidewalls 50 of the lower portion 46 of the bore 42 will forcibly expand the inwardly protruding walls 50 into an interference fit 58 with the adjacent wall 56 of the aperture means 54 of the staking plate member 52 (See FIG. 9). The thickness 60 of a completed assembly, including a staking member 36, at least one head suspension member 28, a shelf segment 24 and a staking plate member 52 should be no greater than the thickness of the actuator arm 22 adjacent the shelf segment 24. (See FIG. 9).

Figure 2:
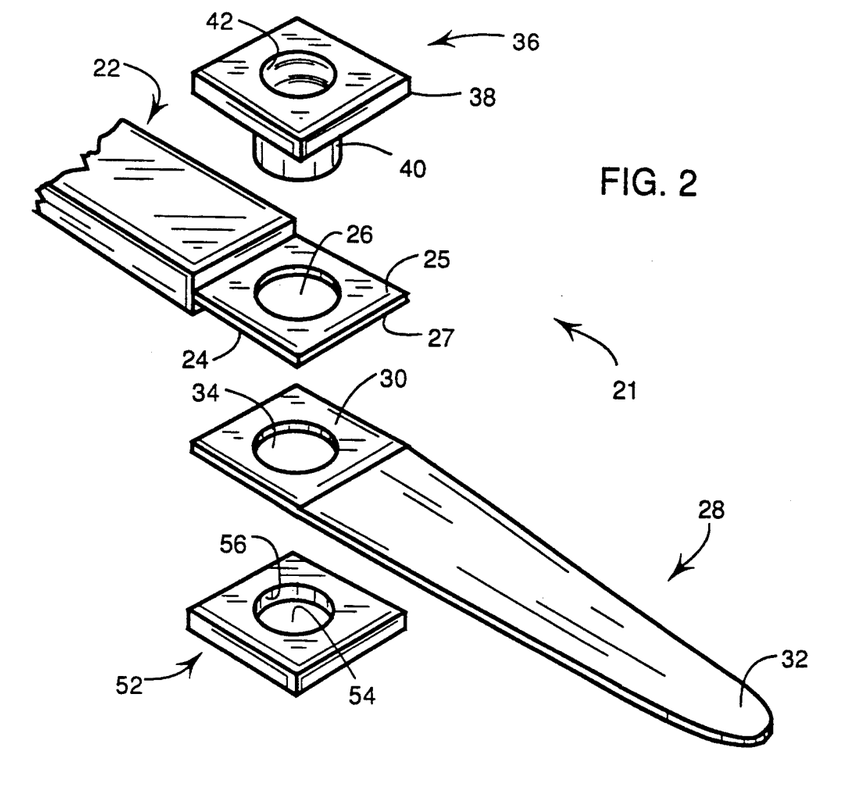
FIG. 2 is an exploded isometric view showing an alternate assembly for securing at least one head suspension member to an opposite surface of the shelf segment of an actuator arm.

Referring now to FIG. 2, there is shown an alternative assembly 21 for securing one head suspension member to an opposite surface 27 of the shelf segment 24. The assembly shown is identical to that of FIG. 1 with the exception of the head suspension member 28 being positioned on the opposite surface 27 of the shelf segment 24 of the actuator arm 22.

Figure 3:
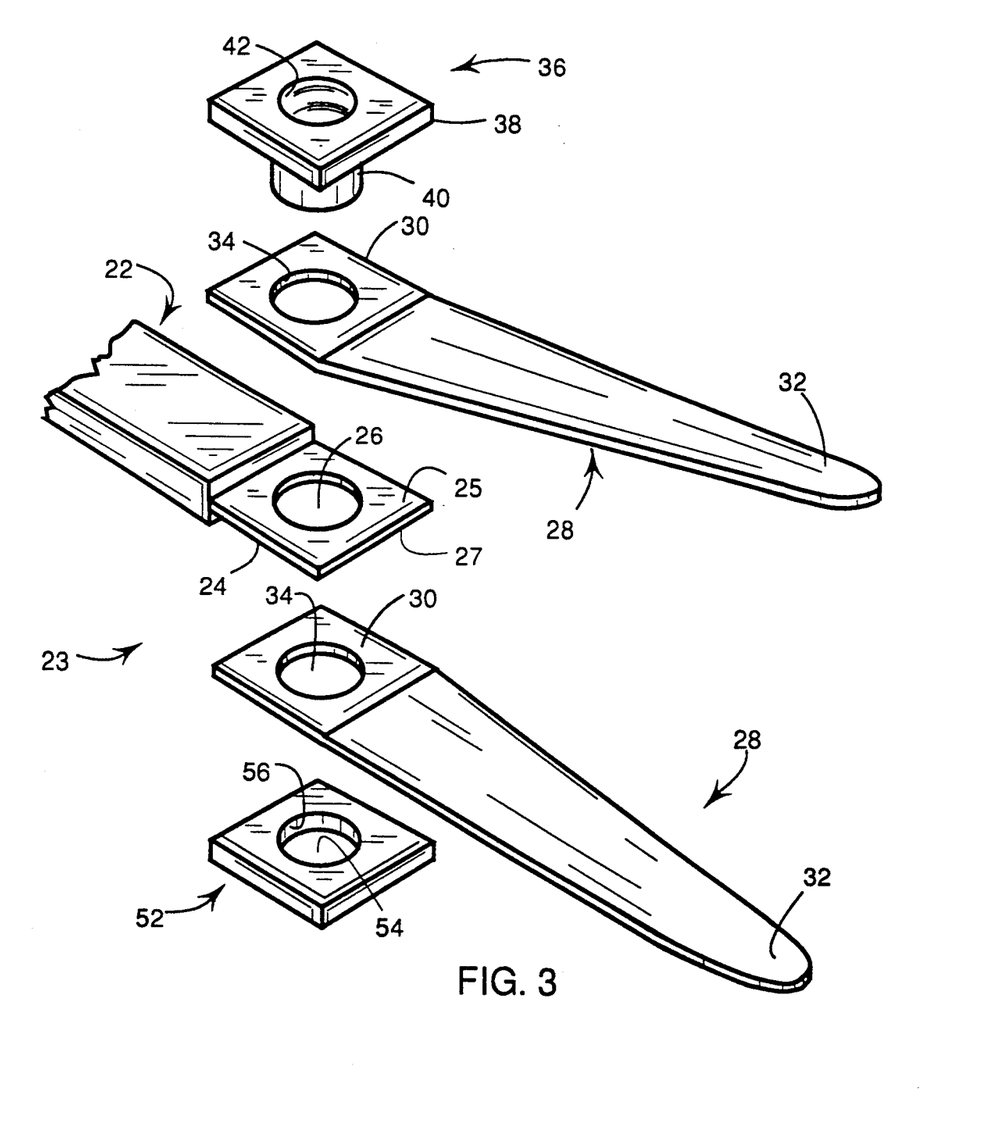
FIG. 3 is an exploded isometric view showing an assembly for securing first and second head suspension members to opposing surfaces of a shelf segment of an actuator arm.

Referring now to FIG. 3, there is shown an assembly 23 for securing first and second head suspension members 28 to opposite surfaces 25 and 27 of the shelf segment 24. The assembly shown in FIG. 3 is identical to that of FIG. 1 with the exceptions of there being a second head suspension member and the two head suspension members being positioned on opposing sides of the shelf segment of the actuator arm.

Figure 8:
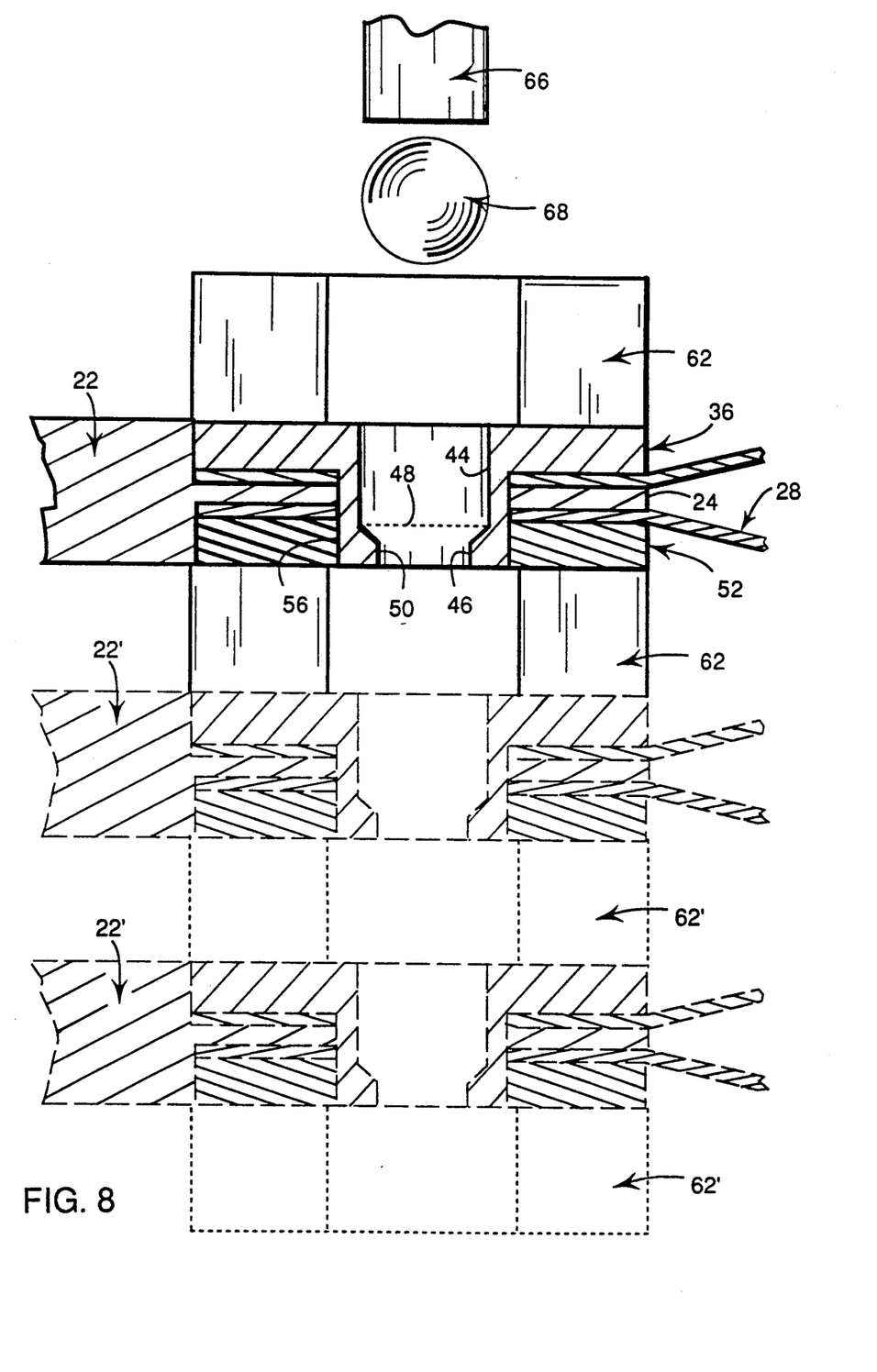
FIG. 8 is a cross sectional view of FIG. 7 taken generally along line 8—8 of FIG. 7 showing, in solid lines, the internal configuration of the assembly and in broken lines, additional like arms and suspension members of a multiple arm assembly with a die and anvil set placed relative to the assembly for one staking operation of a plurality of head suspension members to the several arms.
Figure 9:
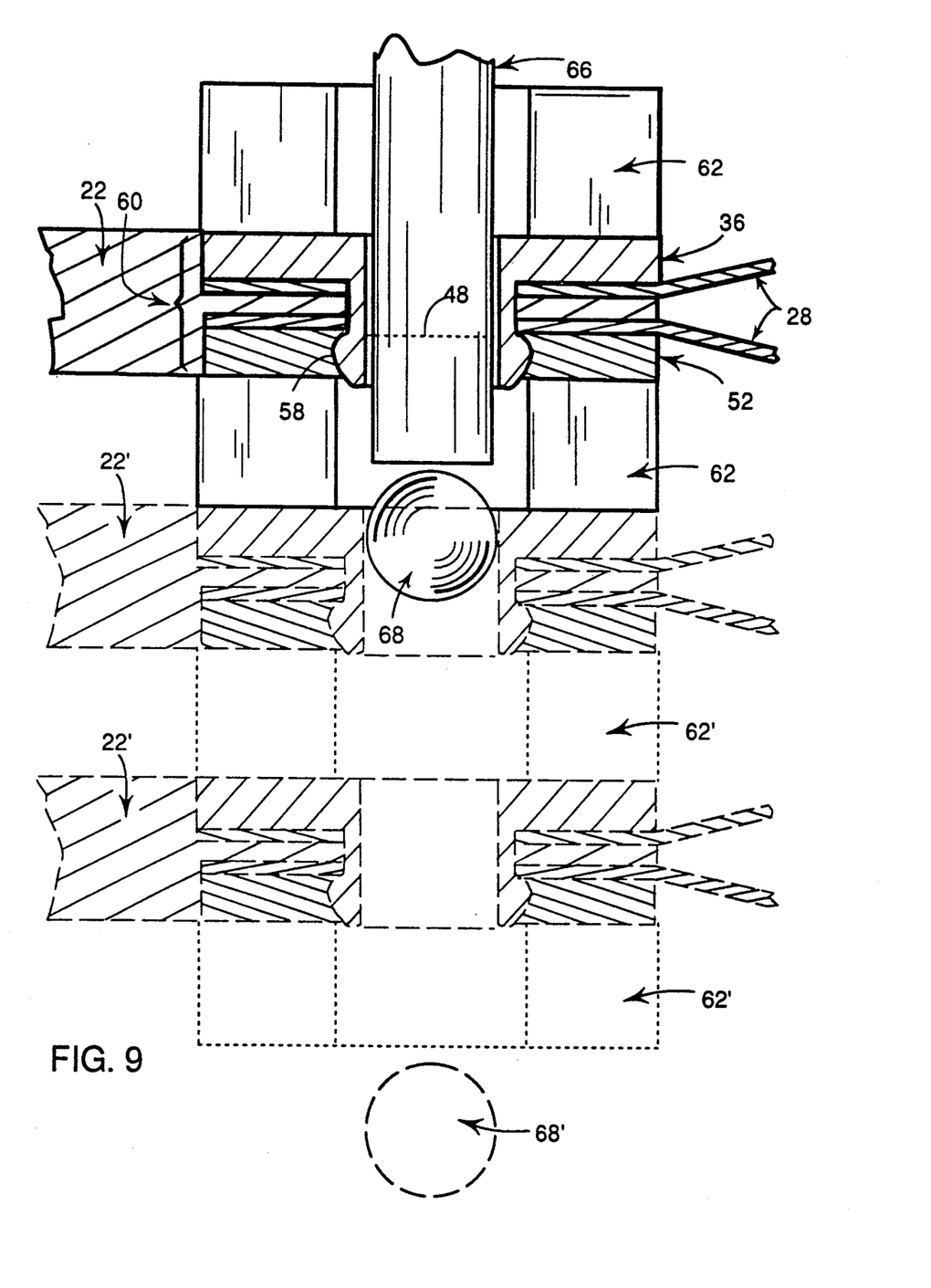
FIG. 9 is a view similar to that of FIG. 8 showing the results of the staking operation.

Referring now to FIGS. 8 and 9 there will be described the method of securing either, one head suspension member 28 to a surface 25 or 27 of a shelf segment 24, or first and second head suspension members 28 to opposing surfaces 25 and 27 of a shelf segment 24, the method having the steps of: providing a staking member 36 as previously described; providing a staking plate member 52 as previously described; aligning the respective apertures of the head suspension member(s) 28 and the shelf segment 24 with the stem element 40 of the staking member 36 where, in the case of one head suspension, the head suspension is aligned on either surface, 25 or 27, of the shelf segment or in the case of first and second head suspensions, the head suspensions are aligned on opposing surfaces, 25 and 27, of the shelf segment; disposing the stem element 40 through the aligned apertures; positioning the staking plate member 52 with its aperture 54 in alignment with and receiving the stem element 40 of the staking member 36; placing the assembly under compression with die 62 and anvil 64 castings; and controllably expanding the inwardly protruding walls 46 of the lower portion 44 of the bore 42 of the staking member 36 into the adjacent wall 56 of the staking plate member 52 to form an interference fit 58. The forcible pressure of the expansion of the inwardly protruding sidewalls 46 is thereby distributed exclusively into the adjacent wall 56 of the staking plate member 36.

The controllable expansion of the inwardly protruding sidewalls is accomplished through the use of dies 62 which act as a clamps to hold and compress the head suspension support assembly, and a staking rod 66 and ball bearing 68 which are driven through the aligned apertures of the assembly. (FIGS. 8 and 9). A staking punch (not shown) may be used as an alternative to the staking rod and ball bearing. The dies serve to effectively immobilize and isolate the head suspension support assembly in order to redistribute the force of the staking procedure from a downward force to a sideward force only occurring within the staking plate member. It is this redistribution of downward force that prevents cracking of the actuator arm shelf. In a single staking procedure only two dies are needed to accomplish the clamping and compression necessary. The dotted line assemblies 22' shown in FIGS. 8 and 9 represent the configuration of dies 62 and 62' that would be employed in staking a plurality of head suspension support assemblies together in a single procedure. In this multi-assembly staking, each of the die members is so dimensioned as to completely fill the spacing in between the head suspension support assemblies (i.e. the thickness of the dies would correspond to the thickness of the spacing between the arms of the actuator assembly See FIG. 10 #80). In so dimensioning the dies 62 and 62' they effectively immobilize and isolate each of the individual head suspension support assemblies 22 and 22' as in the single assembly method with the same effect of redistributing the force of the procedure only into the staking plate members of each assembly. The dies in the multi-assembly staking may either be individual elements or may be formed into a single multi-member die assembly of similar shape as an actuator arm assembly having multiple protruding arms.

Figure 4:
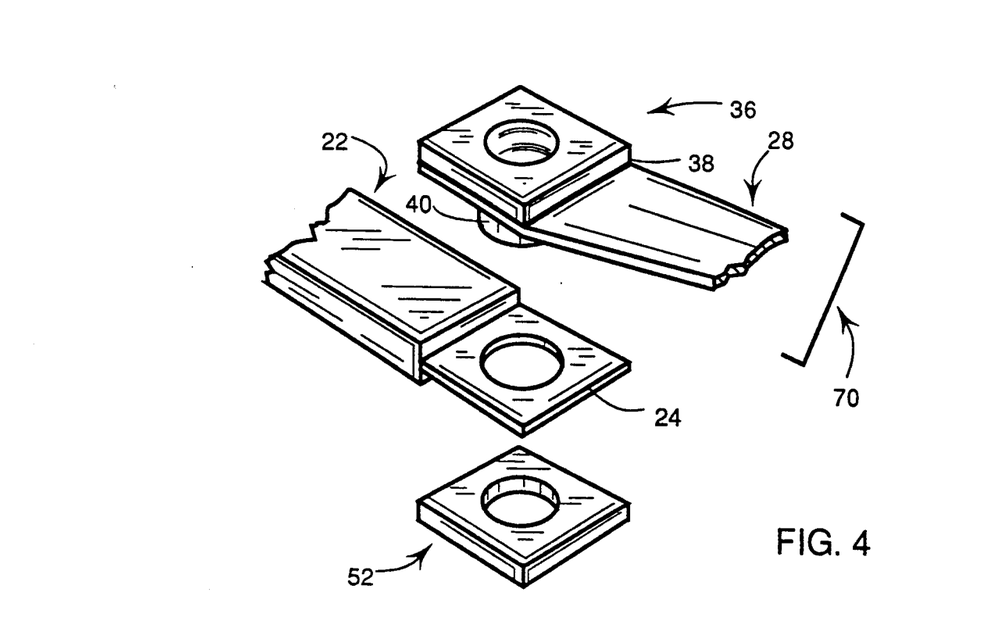
FIG. 4 is an exploded isometric view of the assembly of FIG. 1 showing a sub-assembly used therewith.
Figure 5:
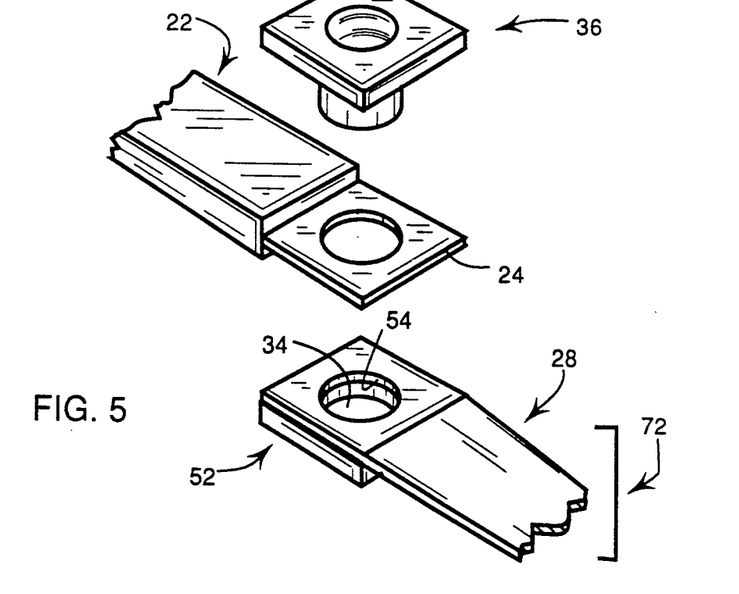
FIG. 5 is an exploded isometric view of the assembly of FIG. 2 showing a sub-assembly used therewith.
Figure 6:
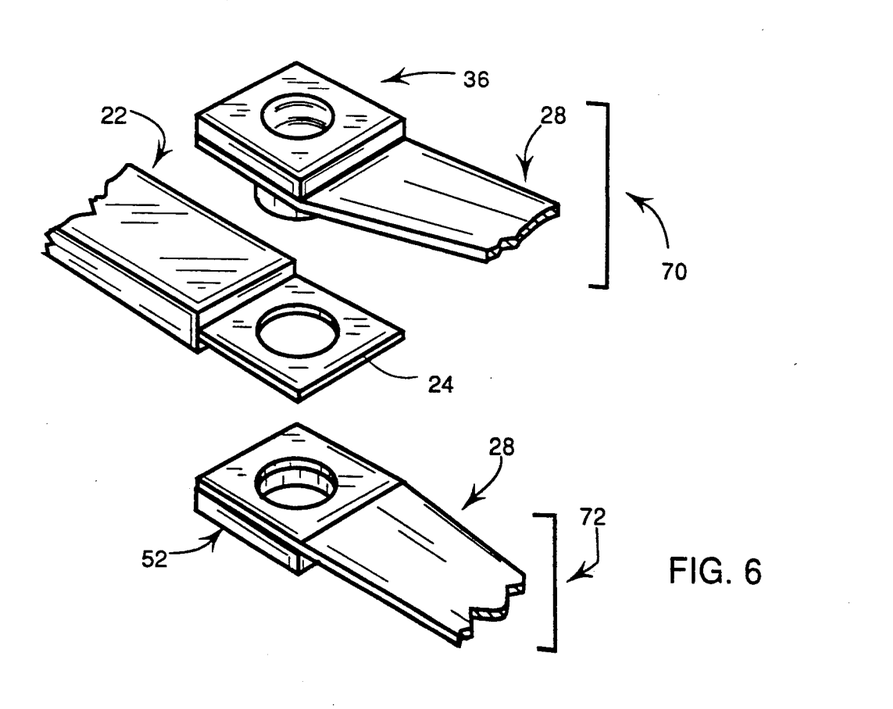
FIG. 6 is an exploded isometric view of the assembly of FIG. 3 showing sub-assemblies used therewith.
Figure 7:
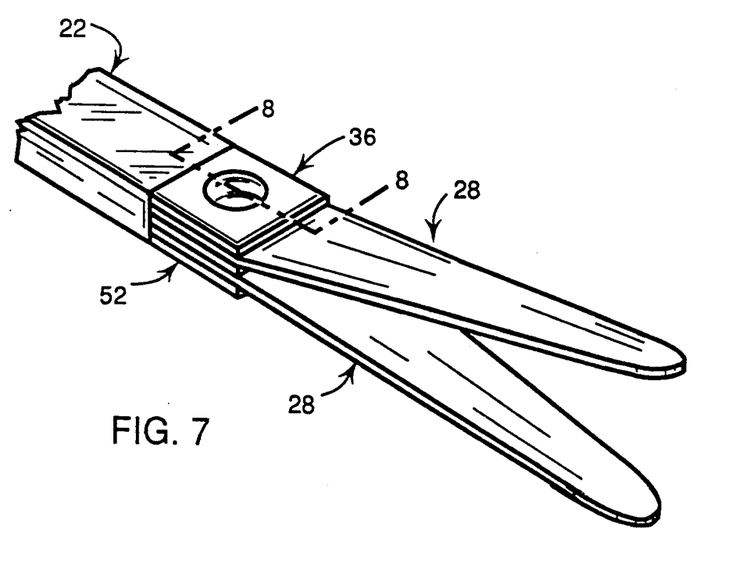
FIG. 7 is an isometric view showing an embodiment of a single actuator arm assembly for securing first and second head suspension members to opposing surfaces of a shelf segment of the actuator arm.

Referring now to FIGS. 4, 5 and 6 there are shown sub-assemblies that may be utilized with the described method to simplify assembly. A staking member 36 and a head suspension member 28 can be combined into a sub-assembly 70 by disposing the stem element 40 of the staking member 100 through the aperture 34 of the head suspension member 28 and attaching the head suspension 28 to the flange element 38 of the staking member 36. (FIG. 4). A staking plate member 52 and a head suspension member 28 can be combined into a sub-assembly 72 by aligning the aperture 34 of the head suspension 28 with the aperture 54 of the staking plate member 52 and attaching the head suspension member 28 to the staking plate member 52. (FIG. 5).

In utilizing these sub-assemblies the method of securing head suspension members is facilitated by eliminating one of the steps in the method for securing one head suspensions member and by eliminating two of the steps in the method for securing first and second head suspension members. In the case of securing one head suspension member the assembly will consist of only three elements instead of four, and in the case of securing first and second head suspension members the assembly will consist of only three elements instead of five.

The method described is flexible, providing for the attachment of a singular head suspension on the staking member surface 25 of the shelf segment, a singular head suspension on the staking plate member surface 27 of the shelf segment and dual head suspension members mounted nearly back to back on opposing surfaces 25 and 27 of the shelf segment.

Figure 10:
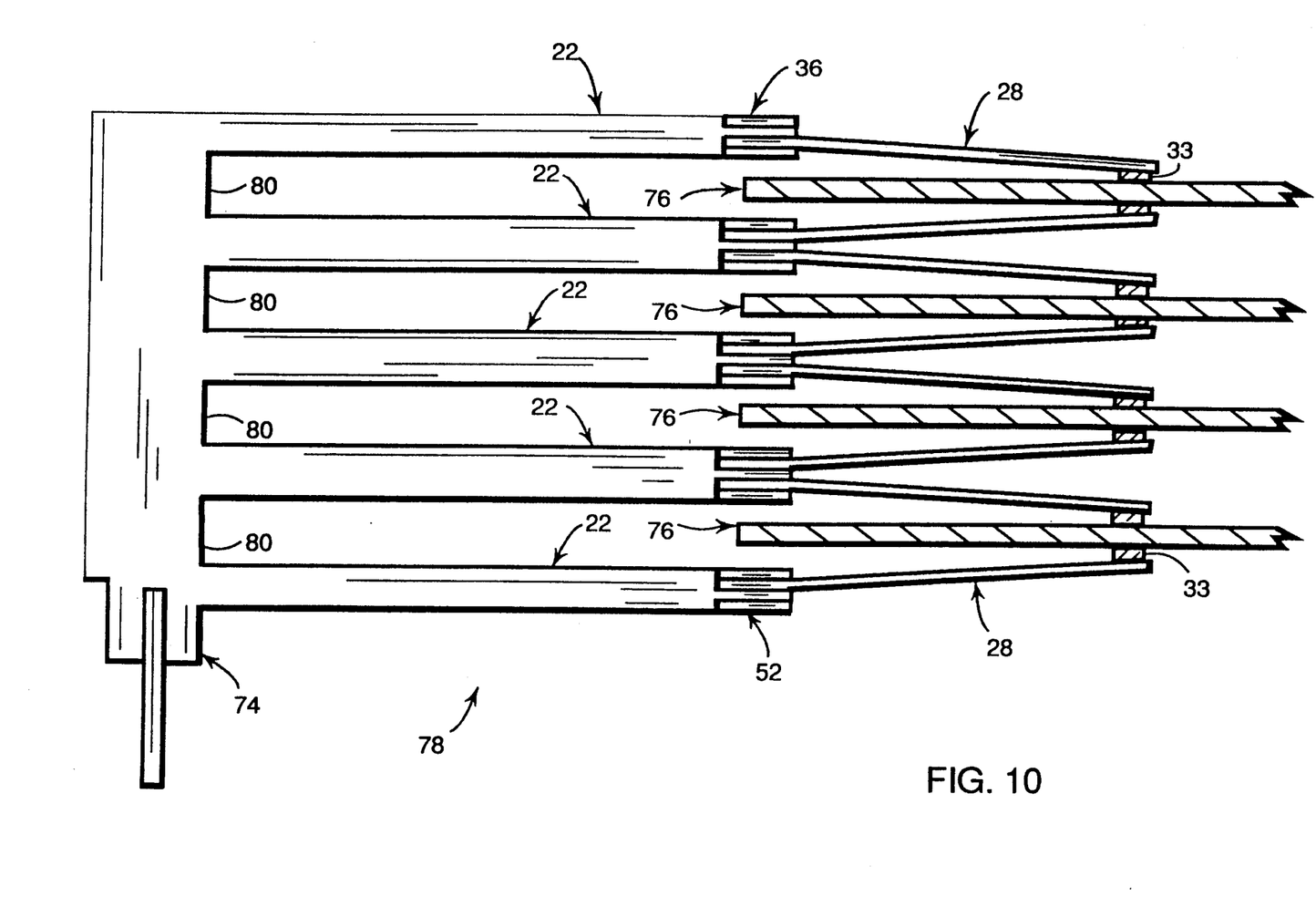
FIG. 10 is a side view, partially in cross-section, showing a multiple arm actuator having head suspension members attached thereto with the head members thereon disks in a multiple disk disk drive.

Referring now to FIG. 10, the preferred application of this method is to provide a means of securing a plurality of head suspension members 28 in both singular and dual assemblies to a plurality of shelf segments of actuator arms 22 on a single multiple arm actuator 74 in a multi-disk 76 disk drive envelope 78 wherein all the assemblies can be staked together in a single procedure. As shown, the uppermost suspension member 28 is a single member secured to the lower surface of the shelf segment of arm 22, while the lowermost suspension member 28 is a single member secured to the upper surface of the shelf segment of arm 22, as shown in FIGS. 2 and 1, respectively. The intervening arms 22 are provided with dual suspension members as shown, for example, in FIG. 3.

While there has been shown and described a preferred embodiment, it is understood that various other adaptations and modifications may be made within the spirit and scope of the invention.

What is claimed is:

1. A head suspension support assembly use in a disk drive, comprising:
    an actuator arm having a reduced thickness shelf segment extending outwardly from the distal end thereof, said shelf segment being aligned with and centered relative to the longitudinal centerline of said arm and further including an aperture;
    at least one head suspension member having proximal and distal ends thereto, said distal end being configured for securing a magnetic head member thereto, and said proximal end having an aperture;
    a staking member having a flange element and a stem element, said staking member having a bore extending through said flange and stem elements, said bore having upper and lower portions separated by a staking line located at a defined dimension from the outer surface of said flange element, said upper portion of said bore having a generally uniform interior diameter, said lower portion of said bore being defined by inwardly protruding sidewalls of said staking member, said inwardly protruding sidewalls creating a smaller interior diameter relative to the upper portion of said bore, said defined dimension generally corresponding to the combined thicknesses of said flange element, said at least one head suspension member and said shelf segment, said staking member being configured for insertion of the stem element thereof through respective aligned apertures of said at least one head suspension member and said shelf segment; and
    a staking plate member having an aperture for receiving said stem element, the aperture being defined by an adjacent wall of said staking plate member, the thickness of said staking plate member generally corresponding with the dimension of the lower portion of said bore of said staking member, wherein impact of an expansion tool with said inwardly protruding sidewalls forcibly expands said inwardly protruding sidewalls into an interference fit with the adjacent wall of said staking plate member.

2. An assembly as claimed in claim 1, wherein said actuator arm is formed of a metallic material.

3. An assembly as claimed in claim 1, wherein said actuator arm is formed of a ceramic material.

4. An assembly as claimed in claim 1, wherein the combined height of said flange and stem elements of said staking member is no greater than the thickness of said actuator arm adjacent said shelf segment.

5. An assembly as claimed in claim 1, wherein said aperture of said at least one head suspension member, said shelf segment and said staking plate member are substantially equal in diameter to the exterior diameter of said stem element of said staking member.

6. An assembly as claimed in claim 1, wherein the thickness of an aligned assembly, including said staking member, said at least one head suspension member, said shelf segment and said staking plate member is no greater than the thickness of said actuator arm adjacent said shelf segment.

7. An assembly as claimed in claim 1, wherein forcible expansion of said inwardly protruding sidewalls takes place solely within the adjacent wall of said staking plate member.

8. An assembly as claimed in claim 1, wherein said staking member and said head suspension member are sub-assembled by disposing said stem element of said staking member through said aperture of said head suspension member and attaching said head suspension member to said flange element of said staking member.

9. An assembly as claimed in claim 1, wherein said staking plate member and said head suspension member are sub-assembled by aligning said aperture of said head suspension member with said aperture of said staking plate member and attaching said head suspension member to said staking plate member.

10. A head suspension support assembly for use in a disk drive, comprising:
    an actuator arm having a reduced thickness shelf segment extending outwardly from the distal end thereof, said shelf segment being aligned with and centered relative to the longitudinal centerline of said arm and further including an aperture;
    first and second generally identical head suspension members having proximal and distal ends thereto, said distal ends being configured for securing magnetic head members thereto, and said proximal ends having an aperture;
    a staking member having a flange element and a stem element, said staking member having a bore extending through said flange and stem elements, said bore having upper and lower portions separated by a staking line located at a defined dimension from the outer surface of said flange element, said upper portion of said bore having a generally uniform interior diameter, said lower portion of said bore being defined by inwardly protruding sidewalls of said staking member, said inwardly protruding sidewalls creating a smaller interior diameter relative to the upper portion of said bore, said defined dimension generally corresponding to the combined thicknesses of said flange element, said first and second head suspension members and said shelf segment, said staking member being configured for insertion of the stem element thereof through respective aligned apertures of said first and second head suspension members and said shelf segment with said first and second head suspension members positioned respectively on opposite surfaces of said shelf segment; and a staking plate member having an aperture for receiving said stem element, the aperture being defined by an adjacent wall of said staking plate member, the thickness of said staking plate member generally corresponding with the dimension of the lower portion of said bore of said staking member, wherein impact of an expansion tool with said inwardly protruding sidewalls forcibly expands said inwardly protruding sidewalls into an interference fit with the adjacent wall of said staking plate member.

11. An assembly as claimed in claim 10, wherein said actuator arm is formed of a metallic material.

12. An assembly as claimed in claim 10, wherein said actuator arm is formed of a ceramic material.

13. An assembly as claimed in claim 10, wherein the combined height of said flange and stem elements of said staking member is no greater than the thickness of said actuator arm adjacent said shelf segment.

14. An assembly as claimed in claim 10, wherein said aperture of said first and second head suspension members, said shelf segment and said staking plate member are substantially equal in diameter to the exterior diameter of said stem element of said staking member.

15. An assembly as claimed in claim 10, wherein the thickness of an aligned assembly, including said staking member, said first and second head suspension member, said shelf segment and said staking plate member is no greater than the thickness of said actuator arm adjacent said shelf segment.

16. An assembly as claimed in claim 10, wherein forcible expansion of said inwardly protruding sidewalls takes place solely within the adjacent wall of said staking plate member.

17. An assembly as claimed in claim 10, wherein said staking member and said first head suspension member are sub-assembled by disposing said stem element of said staking member through said aperture of said first head suspension member and attaching said first head suspension member to said flange element of said staking member.

18. An assembly as claimed in claim 10, wherein said staking plate member and said second head suspension member are sub-assembled by aligning said aperture of said second head suspension member with said aperture of said staking plate member and attaching said second head suspension member to said staking plate member.

19. A method of securing at least one head suspension member to a shelf segment of an actuator arm for providing a head suspension support assembly for use in a disk drive, comprising the steps of:

a providing at least one head suspension member, each said at least one head suspension member having an aperture;

providing an actuator arm having a shelf segment, said shelf segment having an aperture;

providing a staking member having a flange element and a stem element, said staking member having a bore extending through said flange and stem elements, said staking member having inwardly protruding sidewalls creating a smaller interior diameter of the bore adjacent to the distal end of said stem element;

providing a staking plate member having an aperture for receiving the distal end of said stem element, the aperture being defined by an adjacent wall of said staking plate member;

aligning the respective apertures of said at least one head suspension member and said shelf segment with said stem element of said staking member;

disposing said stem element through said aligned apertures;

positioning said staking plate member with the aperture thereof in alignment with and receiving the distal end of said stem element; and controllably expanding said inwardly protruding sidewalls into an interference fit with the adjacent wall of said staking plate member, said inwardly protruding sidewalls being dimensioned and positioned within said staking member for enabling the forcible pressure of said expansion to be distributed solely into the adjacent wall of said staking plate member.

20. A method as claimed in claim 19, wherein the actuator arm is formed of a metallic material.

21. A method as claimed in claim 19, wherein the actuator arm is formed of a ceramic material.

22. A method as claimed in claim 19, wherein controllably expanding said inwardly protruding sidewalls includes placing the assembly under compression with die elements and driving means for staking through the aligned apertures of the assembly.

23. A method as claimed in claim 19, wherein aligning the assembly includes sub-assembling said staking member and said head suspension member by disposing said stem element of said staking member through said aperture of said head suspension member and attaching said head suspension member to said flange element of said staking member.

24. A method as claimed in claim 19, wherein aligning the assembly includes sub-assembling said staking plate member and said head suspension member by aligning said aperture of said head suspension member with said aperture of said staking plate member and attaching said head suspension member to said staking plate member.

25. A method of securing generally identical first and second head suspension members to a shelf segment of an actuator arm for providing a head suspension support assembly use in a disk drive, comprising the steps of:

providing generally identical first and second head suspension member, each said generally identical first and second head suspension member having an aperture;

providing an actuator arm having a shelf segment, said shelf segment having an aperture;

providing a staking member having a flange element and a stem element, said staking member having a bore extending through said flange and stem elements, said staking member having inwardly protruding sidewalls creating a smaller interior diameter of said bore adjacent to the distal end of said stem element;

providing a staking plate member having an aperture for receiving the distal end of said stem element, the aperture being defined by an adjacent wall of said staking plate member;

aligning the respective apertures of said generally identical first and second head suspension members with said shelf segment, said first and second head suspensions positioned on opposing surfaces of said shelf segment and further aligning said aligned apertures with said stem element of said staking member;

disposing said stem element through said aligned apertures;

positioning said staking plate member with the aperture thereof in alignment with and receiving the distal end of said stem element; and controllably expanding said inwardly protruding sidewalls into an interference fit with the adjacent wall of said staking plate member, said inwardly protruding sidewalls being dimensioned and positioned within said staking member for enabling the forcible pressure of said expansion to be distributed solely into the adjacent wall of said staking plate member.

26. A method as claimed in claim 25, wherein the actuator arm is formed of a metallic material.

27. A method as claimed in claim 25, wherein the actuator arm is formed of a ceramic material.

28. A method as claimed in claim 25, wherein controllably expanding said inwardly protruding sidewalls includes placing the assembly under compression with die elements and driving means for staking through the aligned apertures of the assembly.

29. A method as claimed in claim 25, wherein aligning the assembly includes sub-assembling said staking member and said first head suspension member by disposing said stem element of said staking member through said aperture of said first head suspension member and attaching said first head suspension member to said flange element of said staking member.

30. A method as claimed in claim 25, wherein aligning the assembly includes sub-assembling said staking plate member and said second head suspension member by aligning said aperture of said second head suspension member with said aperture of said staking plate member and attaching said second head suspension member to said staking plate member.

31. A method of securing a plurality of generally identical head suspension members to the shelf segments of a plurality of generally identical actuator arms for providing a head suspension support assembly for each of said arms for use in a multi-disk drive, comprising the steps of:

providing a plurality of generally identical head suspension member, each said head suspension member having an aperture;

providing a plurality of generally identical actuator arms, each said actuator arm having a shelf segment, each said shelf segment having an aperture;

providing a plurality of generally identical staking members having a flange element and stem element, said staking members having a bore extending through said flange and stem elements, said staking members having inwardly protruding sidewalls creating smaller interior diameters of said bores adjacent to the distal ends of said stem elements;

providing a plurality of generally identical staking plate members each having an aperture for receiving the distal ends of said stem elements, each aperture being defined by an adjacent wall of the respective staking plate member;

aligning the respective apertures of said head suspension members and said shelf segments with said stem elements of said staking members;

disposing said stem elements through said aligned apertures;

positioning said staking plate members with the apertures thereof in alignment with and receiving the distal ends of said stem elements; and controllably expanding said inwardly protruding sidewalls into a plurality of interference fits with the adjacent walls of said staking plate members, said inwardly protruding sidewalls being dimensioned and positioned with said staking member for enabling the forcible pressure of said expansions to be distributed solely into the adjacent walls of said staking plate members.

32. A method as claimed in claim 31, wherein the actuator arms are formed of a metallic material.

33. A method as claimed in claim 31, wherein the actuator arms are formed of a ceramic material.

34. A method as claimed in claim 31, wherein aligning the assemblies includes sub-assembling said staking members and said head suspension members by disposing said stem elements of said staking members through said aperture of said head suspension members and attaching said head suspension members to said flange elements of said staking members.

35. A method as claimed in claim 31, wherein the step of aligning includes sub-assembling said staking plate members and said head suspension members by aligning said aperture of said head suspension member with said aperture of said staking plate members and attaching said head suspension members to said staking plate member.

36. A method as claimed in claim 31, wherein controllably expanding said inwardly protruding sidewalls includes placing the plurality of assemblies under compression with a plurality of die elements and driving means for staking through the aligned apertures of the assembly.

37. A method as claimed in claim 36, wherein said die elements are so dimensioned as to completely fill the space between adjacent ones of said head suspension support assembly and act as clamps to effectively immobilize said assemblies during staking.

38. A method as claimed in claim 31, wherein controllably expanding said inwardly protruding sidewalls includes placing the plurality of assemblies under compression with a singular multi-member die assembly and driving means for staking through the aligned apertures of the assembly.

39. A method as claimed in claim 35, wherein said singular multi-member die assembly is so dimensioned as to completely fill the space between each adjacent ones of said head suspension support assembly and act as a clamp to effectively hold and immobilize said assemblies during staking.

* * * * *